United States Patent Office 3,634,512
Patented Jan. 11, 1972

3,634,512
PRODUCTION OF DIAMINODICYCLOHEXYL-
ALKANES OR ETHERS
Guenter Poehler, Ludwigshafen, Ludwig Wolf, Hassloch, and Hubert Corr and Kurt Pilch, Ludwigshafen, Germany, assignors to Badische Anilin- & Soda-Fabrik Aktiengesellschaft, Ludwigshafen (Rhine), Germany
No Drawing. Filed Dec. 2, 1968, Ser. No. 780,561
Claims priority, application Germany, Dec. 1, 1967,
P 16 43 704.0
Int. Cl. C07c 85/14
U.S. Cl. 260—563 D       11 Claims

ABSTRACT OF THE DISCLOSURE

Production of diaminodicyclohexylalkanes or ethers by hydrogenation of diaminodiphenylalkanes or ethers at elevated temperature and superatmospheric pressure in the presence of a supported catalyst containing cobalt or nickel which has been prepared by treating the carrier material (and/or the finished catalyst) with a basic reacting alkali metal or alkaline earth metal compound and then with a binder, applying finely divided cobalt oxide or nickel oxide or finely divided compounds of cobalt or nickel which change into the oxides when heated, and then drying and heating it to 500° to 1100° C.

This invention relates to an improved process for the production of diaminodicyclohexylalkanes or ethers by hydrogenation of diaminodiphenylalkanes or ethers.

It is known from U.S. patent specification No. 2,606,-927 that aminodiphenylalkanes can be hydrogenated in the presence of ethers such as dioxane and cobalt or nickel catalysts. The yields of diaminodicyclohexylalkanes obtained by this process are however unsatisfactory. According to another method described in U.S. patent specification No. 2,606,924 good yields are obtained in the hydrogenation of 4,4-diaminodiphenylmethane with ruthenium catalysts in "the presence" of dioxane. Ruthenium catalysts are however not very suitable for industrial purposes however because they are very expensive. Furthermore it is already known from British patent specification No. 718,-508 that the hydrogenation of 4,4'-diaminodiphenylmethane with cobalt or nickel catalysts proceeds with high yields in the presence of water-repellent solvents and alkaline earth metal oxides. This process is not suitable for continuous operation because the catalyst composition cakes after a short time, thus losing its activity.

The object of the invention is to provide an improved process for the production of diaminodicyclohexylalkanes or ethers in which good yields are obtained. It is a further object of the invention to provide a process in which the catalyst gives good and consistant results and has a long life.

It is another object of this invention to provide a process capable of being carried out continuously on a commercial scale.

In accordance with this invention these and other objects and advantages are achieved in an improved process for the production of diaminodicyclohexylalkanes or ethers at by hydrogenation of diaminodiphenylalkanes or ethers at elevated temperature and at superatmospheric pressure in the presence of supported catalysts containing cobalt or nickel, the improvement consisting in using a supported catalyst containing cobalt or nickel which has been prepared by treating the carrier material (and/or the finished catalyst) with a basic reacting alkali or alkaline earth metal compound and then with a binder, applying finely divided cobalt oxide or nickel oxide (or a finely divided cobalt or nickel compound which changes into the oxide when heated) and then drying it and heating it to 500° to 1100° C.

We have now found that diaminodicyclohexylalkanes or ethers can be obtained more advantageously than hitherto by hydrogenation of diaminodiphenylalkanes or ethers at elevated temperature and at superatmospheric pressure in the presence of a supported catalyst containing cobalt or nickel, when a supported catalyst containing cobalt or nickel is used which has been prepared by treating the carrier material (and/or the finished catalyst) with a basic reacting alkali or alkaline earth metal compound and then with a binder, applying finely divided cobalt oxide or nickel oxide (or a finely divided cobalt or nickel compound which is converted into the oxide when heated) and then drying it and heating it to 500° to 1100° C.

The new process has the advantage that good yields of diaminodicyclohexylalkanes or ethers are obtained and the catalyst has a long life and gives good and consistant results.

The new process has proved to be particularly suitable for continuous operation.

Preferred diaminodiphenylalkanes or ethers have the general formula:

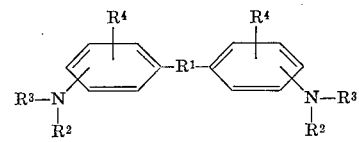

where $R^1$ denotes an alkylene or alkylidene radical having one to four carbon atoms or an oxygen atom, $R^2$ and $R^3$ each denotes a hydrogen atom or an alkyl radical having one to four carbon atoms such as a methyl, ethyl, isopropyl or butyl radical and $R^4$ denotes a hydrogen atom or an aliphatic hydrocarbon radical having up to twelve carbon atoms, particularly an alkyl radical having one to four carbon atoms, or a halogen atom or an alkoxy radical having one to four carbon atoms. Examples of suitable compounds are:

4,4'-diaminodiphenylmethane,
4,4'-diamino-2,2'-didodecyldiphenylmethane,
N,N'-dibutyl-4,4'-diaminodiphenylmethane,
4,4'-diaminodiphenylpropane-(1,3),
4,4'-diaminodiphenylbutane-(1,4),
4,4'-diaminodiphenylpropane-(2,2),
2,2'-diaminodiphenylmethane,
4,4'-diamino-2,2'-dichlorodiphenylpropane-(2,2),
2,2'-diamino-5,5'-dimethoxydiphenylmethane, and
N,N'-dimethyl-4,4'-diaminodiphenyl ether.

The following have particular commercial importance as starting materials: 4,4'-diaminodiphenylmethane, 4,4'-diamino-2,2'-dimethyldiphenylmethane and 4,4'-diaminodiphenylpropane-(2,2). Diaminodiphenylmethane, diaminotolylmethane and diaminodiphenylpropane - (2,2) have acquired special commercial importance.

Hydrogenation may be carried out in the absence of solvents. It is also possible however to use solvents which are inert under the reaction conditions such as hydrocarbons, for example cyclohexane, or cyclic ethers such as tetrahydrofuran or dioxane.

The process is preferably carried out at temperatures of from 140° to 300° C., particularly from 170° to 250° C. It is advantageously to use pressures of from 100 to 700, particularly of from 200 to 400, atmospheres.

Supported catalysts containing cobalt or nickel are used. Examples of suitable carrier substances are pumice, aluminas, natural or synthetic silicates, diatomaceous earth, zinc oxide, magnesium oxide or titanium oxide. Preferred catalysts contain 14 to 40% by weight, particularly 20 to 40% by weight, of cobalt or nickel as metal, with reference to the sum of carrier substance and metal. In addition to cobalt or nickel, the support catalysts advantageously contain 0.01 to 5% by weight (with reference to the metal contained in the support catalyst) of activator. Examples of suitable activators are manganese, chromium, tungsten, molybdenum, copper or iron.

The way in which the support catalyst is prepared is an essential feature of the invention. The carrier material is preferably first treated with a basic reacting alkali metal compound or alkaline earth metal compound which is advantageously dissolved in water, treatment being for example by impregnation. Examples of suitable alkali metal compounds or alkaline earth metal compounds are sodium carbonate, potassium carbonate, sodium hydroxide, potassium hydroxide, tertiary sodium phosphate, tertiary potassium phosphate, calcium hydroxide or barium hydroxide. The carbonates of the alkali metals are especially preferred. It is preferable to apply only such an amount of the alkali metal compound or alkaline earth metal compound that its content amounts to 2 to 8% by weight with reference to the sum of carrier material and metal compound (calculated as alkali metal oxide or alkaline earth metal oxide). It is also possible to incorporate the basic reacting alkali or alkaline earth metal compound into the finished catalyst instead of into the carrier material. The carrier material is then treated with a binder. Examples of suitable binders are glyoxal, saccharides, polysaccharides such as starch or degradation products thereof, polymers such as rubber, synthetic rubber, polybutadiene, polyamides, or resins such as polyester resins, epoxy resins or colophony. Glyoxal and saccharides have proved to be particularly suitable as binders. It is advantageous to apply from 4 to 12% by weight, particularly 6 to 9% by weight, of the said substances to the carrier substance. It is advantageous to use the said substances in 20 to 40% solution in a suitable solvent. Then the carrier substance thus treated has applied to it a finely divided cobalt or nickel compound which is converted into the oxide when heated, or the oxide itself. Examples of suitable cobalt or nickel compounds are their carbonates, nitrates, formates, oxalates or ammoniates. It is especially preferred to use the oxides. The cobalt or nickel compounds or oxides are advantageously applied in a particle size of from 0.02 to 0.1 mm. The carrier material thus treated is then dried advantageously for three to fifteen hours at from 100° to 200° C., and then heated preferably at temperatures of from 400° to 650° C. in order to convert the metal compounds into their oxides. The supported catalyst is then heated for example for from three to nine hours at from 500° to 1100° C., particularly from 550° to 800° C. The storable catalyst is preferably reduced, for example at atmospheric pressure and at from 200° C. to 400° C., with hydrogen prior to use.

The process according to this invention may be carried out for example by passing over a catalyst which has been prepared, and is composed, as above described and which is stationarily arranged in a vertical high pressure tube, a diaminodiphenylalkane or ether, with or without a suitable solvent, and hydrogen, downwardly under the specified pressure and temperature conditions. The diaminodicyclohexylalkane or ether is isolated from the discharge by fractional distillation. It is advantageous to recycle the hydrogen with or without some of the reaction product.

Diaminodicyclohexylalkanes or ethers which have been prepared by the process according to this invention are valuable starting materials for the production of high molecular weight compounds, for example polyamides. They may also be used for curing epoxy resins.

The invention is illustrated by the following examples.

EXAMPLE 1

20 kg. of pumice is broken into 3 to 4 mm. particles and introduced into 60 kg. of a 10% aqueous sodium carbonate solution. The mixture is boiled for fifteen minutes. The impregnated particles of pumice are separated from the hot sodium carbonate solution. 1 kg. of dry particles of pumice contains 62 g. of sodium carbonate. The still moist pieces are wetted with 5.5 kg. of a 30% aqueous solution of glyoxal and dusted with 24 kg. of cobalt oxide powder. The catalyst is then dried at 120° C. for ten hours and thereupon heated for another ten hours at 450° C. The catalyst is then heated in a muffle furnace for six hours at 700° C. Thereafter the catalyst is again immersed in a 10% aqueous solution of sodium carbonate, separated from the liquid and dried for ten hours at 110° C.

A tube having a length of 1.5 meters and a diameter of 30 mm. is filled with this catalyst. During each hour 125 g. of molten 4,4'-diaminodiphenylmethane is introduced together with 2000 liters (STP) of hydrogen and passed over the catalyst at a temperature of 237° to 240° C. and at a pressure of 250 atmospheres. The hourly discharge consists to the extent of 87% of 4,4'-diaminodicyclohexylmethane and 8% of aminocyclohexylaminophenylmethane which is returned. Also 3% of cracked products such as aminocyclohexylcyclohexylmethane, and 2% of high boiling point residue are contained in the discharge.

EXAMPLE 2

20 kg. of pumice broken up into 3 to 4 mm. particles is introduced into 60 kg. of a boiling 8% milk of lime while stirring and left therein for fifteen minutes. After the excess of milk of lime has been separated, the moist product while still hot is wetted with 5.5 kg. of a 30% aqueous solution of beet sugar and dust with 24 kg. of cobalt oxide powder. The catalyst is then dried for twenty-four hours at 110° C. and then heat for four hours at 450° C. and for another six hours at 950° C. The catalyst is then sprayed with 3 kg. of a 10% solution of sodium carbonate and dried for ten hours at 110° C.

A tube which has a length of 1500 mm. and a diameter of 30 mm. and which is resistant to pressure is filled with the said catalyst. 140 g. of molten 4,4'-diamino-2,2'-dimethyldiphenylmethane is introduced at the upper end of the tube together with 2000 liters (STP) of hydrogen and passed over the catalyst at from 210° to 230° C. and at a pressure of 250 atmospheres. The hourly discharge consists to the extent of 87% of 4,4'-diamino-2,2'-dimethyldicyclohexylmethane, 8% of an intermediate product in which only one benzene nucleus is hydrogenated and which is recycled, 3% of cracked products and 2% of high boiling point residue.

We claim:

1. A process for the production of bis(aminocyclohexyl)-alkanes or ethers having the formula

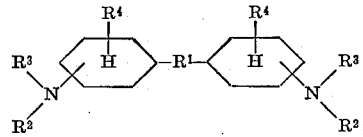

wherein $R^1$ denotes an alkylene or alkylidene radical having one to four carbon atoms or an oxygen atom, $R^2$ and $R^3$ each denotes a hydrogen atom or an alkyl radical having one to four carbon atoms and $R^4$ denotes a hydrogen or halogen atom or an alkyl or an alkoxy group respectively having one to four carbon atoms by contacting the corresponding bis-(amino-phenyl)-alkane or ether with hydrogen at temperatures of from 140° to 300° C. and at pressures of from 100 to 700 atmospheres in the presence of a supported catalyst containing cobalt or nickel characterized by said supported catalyst containing 14 to 40% by weight, as the metal, of cobalt oxide or nickel oxide, with reference to the sum of metal and carrier material, and having been prepared by treating at least one of the carrier material and the finished catalyst with sodium carbonate, potassium carbonate, sodium hydroxide, potassium hydroxide, tertiary sodium phosphate, tertiary potassium phosphate, calcium hydroxide or barium hydroxide and then with a binder, applying to the carrier material finely divided cobalt or nickel oxide or a finely divided cobalt or nickel compound which changes into the oxide when heated, drying the latter composition and then heating it to 500° to 1100° C.

2. A process as claimed in claim 1 wherein the starting diamino compound is diaminodiphenylmethane.

3. A process as claimed in claim 1 wherein the starting diamino compound is diaminodiphenylpropane-(2,2).

4. A process as claimed in claim 1 wherein the starting diamino compound is diaminoditolylmethane.

5. A process as claimed in claim 1 wherein a temperature of from 170° to 250° C. is used for the hydrogenation.

6. A process as claimed in claim 1 carried out at a pressure of from 200 to 400 atmospheres.

7. A process as claimed in claim 1 wherein an alkali metal carbonate is used as the treating compound.

8. A process as claimed in claim 1 wherein glyoxal is used as the binder.

9. A process as claimed in claim 1 wherein a saccharide is used as the binder.

10. A process as claimed in claim 1 wherein the amount of binder used is from 4 to 12% by weight with reference to the carrier material.

11. A process as claimed in claim 1 wherein the amount of alkali metal or alkaline earth metal compound used to treat at least one of said carrier material and said finished catalyst is in the range of 2–8% by weight with reference to the sum of the carrier material and the metal compound and calculated as alkali metal oxide or alkaline earth metal oxide.

References Cited

FOREIGN PATENTS 718,508    1954    Great Britain _____ 260—563

OTHER REFERENCES

Barkdoll et al.: "J.A.C.S.," vol. 75 (1953), pp. 1156–59.

ALEX MAZEL, Primary Examiner

D. R. PHILLIPS, Assistant Examiner

U.S. Cl. X.R.

252—437, 443, 474; 260—563 B